US006449984B1

United States Patent
Paradowski

(10) Patent No.: US 6,449,984 B1
(45) Date of Patent: Sep. 17, 2002

(54) PROCESS FOR LIQUEFACTION OF AND NITROGEN EXTRACTION FROM NATURAL GAS, APPARATUS FOR IMPLEMENTATION OF THE PROCESS, AND GASES OBTAINED BY THE PROCESS

(75) Inventor: Henri Paradowski, Cergy (FR)

(73) Assignee: Technip, Courbevoie (FR)

( * ) Notice: Subject to any disclaimer, the term of this patent is extended or adjusted under 35 U.S.C. 154(b) by 0 days.

(21) Appl. No.: 09/968,610

(22) Filed: Oct. 2, 2001

(30) Foreign Application Priority Data

Jul. 4, 2001 (FR) .............................. 01 08883

(51) Int. Cl.[7] .................................. F25J 1/00
(52) U.S. Cl. ............................ 62/613; 62/619; 62/630; 62/927
(58) Field of Search .................. 62/927, 630, 613, 62/619

(56) References Cited

U.S. PATENT DOCUMENTS

| 3,874,184 A | | 4/1975 | Harper et al. |
|---|---|---|---|
| 4,352,685 A | | 10/1982 | Swallow |
| 4,504,295 A | * | 3/1985 | Davis et al. .................. 62/927 |
| 4,592,766 A | * | 6/1986 | Pahade et al. ................ 62/927 |
| 4,710,212 A | * | 12/1987 | Hanson et al. ................ 62/927 |
| 4,778,498 A | | 10/1988 | Hanson et al. |
| 4,987,744 A | | 1/1991 | Handley et al. |
| 5,617,741 A | | 4/1997 | McNeil et al. |

FOREIGN PATENT DOCUMENTS

DE 3822175 1/1990

* cited by examiner

*Primary Examiner*—Ronald Capossela
(74) *Attorney, Agent, or Firm*—Leydig, Voit & Mayer, Ltd.

(57) ABSTRACT

A process for liquefaction of and nitrogen extraction from natural gas, an installation for implementation of the process, and gases obtained by this process. In the process, a first top fraction is cooled and liquefied, separated into a second top fraction which is relatively volatile and which provides gaseous nitrogen, and into a second bottom fraction which is withdrawn. The first bottom fraction is cooled in order to provide liquefied natural gas essentially free nitrogen.

11 Claims, 2 Drawing Sheets

PROCESS FOR LIQUEFACTION OF AND NITROGEN EXTRACTION FROM NATURAL GAS, APPARATUS FOR IMPLEMENTATION OF THE PROCESS, AND GASES OBTAINED BY THE PROCESS

FIELD OF THE INVENTION

The present invention relates generally to the gas industry and in particular to a process for liquefaction of and nitrogen extraction from natural gas under pressure.

Liquefaction and nitrogen extraction processes of this type are well known to those skilled in the art, and have been used for numerous years. Cooling, lowering of pressure, and liquefaction and fractionation are carried out, in a known manner, in separate installations using appropriate means.

The process for liquefaction of natural gas is used in a known manner for the purpose of eliminating the nitrogen that is sometimes present in large quantity in the natural gas. This solution has the advantage of being economical from the standpoint of the energy consumption necessary for nitrogen extraction from and liquefaction of the natural gas.

In this case, the nitrogen produced contains large quantities of hydrocarbons (up to 50–60%), and therefore cannot be discharged directly into the atmosphere. This nitrogen, which is rich in hydrocarbons or fuel gas, can be used to supply gas turbines. This fuel gas can also be burned in the surplus gas flare.

In all cases, the burning of gas containing large proportions of nitrogen produces large quantities of nitrogen oxides which are significant atmospheric pollutants. Among the nitrogen oxides, certain ones are irritating and/or toxic gases which promote the appearance of respiratory diseases such as asthma. A public health problem arises from this, which does not allow installation, in urban zones, of nitrogen extraction units of known technology to be reasonably considered.

Moreover, during operation of the surplus gas flare, flames that can be over ten meters high are produced, thus presenting non-negligible safety risks.

Finally, the burning of fuel gas also produces large quantities of carbon dioxide which is responsible for a significant greenhouse effect, particularly because of its extensive absorption of light in the infrared domain.

The use of means for reducing the nitrogen oxides or else for absorbing the carbon dioxide contained in the exhaust vapors is known. However, these techniques are very expensive and would make the production of liquefied natural gas (LNG) unprofitable.

SUMMARY OF THE INVENTION

In this context, a first aim of the invention is to propose a process which enables one to eliminate pollution due to production of nitrogen oxides, and to limit the production of carbon dioxide.

More precisely, according to one of its first aspects, the invention relates to a process for liquefaction of and nitrogen extraction from a natural gas under pressure, containing methane, $C_2$, d higher hydrocarbons and nitrogen, in order to obtain, on the one hand, a liquefied natural gas essentially free of nitrogen, and, on the other hand, gaseous nitrogen essentially free of hydrocarbons, which includes a first step (I) in which the natural gas is cooled, has its pressure reduced, is liquefied in order to provide a flow of pressure-reduced liquefied natural gas, and in which the pressure-reduced liquefied natural gas is separated, in a first fractionation column containing a number of stages, into a first top fraction that is relatively more volatile and that is nitrogen enriched, which is collected in the last stage of the first fractionation column, and a first bottom fraction that is relatively less volatile and that is nitrogen poor.

The process of the invention includes a second step (II) in which the first top fraction is cooled and liquefied in order to provide a first cooled and liquefied fraction, the first cooled and liquefied fraction is separated into a second top fraction that is relatively more volatile and very nitrogen enriched, and into a second bottom fraction that is relatively less volatile and relatively less nitrogen enriched, the second bottom fraction is introduced into the last stage of said first fractionation column, the second top fraction is heated in order to provide gaseous nitrogen, and the first bottom fraction is cooled in order to provide liquefied natural gas that is essentially free of nitrogen.

Thus, the discharges mainly consist of nitrogen, and are essentially free of hydrocarbons.

One of the merits of the invention is the discovery of an economical solution, by comparison to known means of reducing nitrogen oxides and eliminating carbon dioxide produced by the combustion of nitrogen-rich gases containing hydrocarbons. The invention shows that it is possible (a) to effectively separate the nitrogen from the natural gas and (b) to produce, on the one hand, nitrogen, essentially free of hydrocarbons, that can possibly be discharged without treatment into the atmosphere, and on the other hand, liquefied natural gas, in a single operation. The invention therefore enables one to avoid burning in general, and in particular, burning of nitrogen-rich gases issuing from natural gas nitrogen extraction, while limiting discharges of atmospheric pollutants.

Another merit of the invention is that the steps of liquefaction of and nitrogen extraction from the natural gas are combined in a single installation. This combination has the surprising advantage of reducing the costs of production of the liquefied natural gas, while making it possible to limit the environmental impact of the gaseous discharges. Moreover, the process of the invention uses a limited number of steps, consequently allowing simplified production because of the limited number of elements to be assembled.

The process of the invention can furthermore include a third step (III) in which the first bottom fraction, before being cooled in order to obtain liquefied natural gas essentially free of nitrogen, is cooled, has its pressure reduced, and is introduced into a first relatively warmer stage of a second fractionation column, and the second top fraction, before being heated in order to provide gaseous nitrogen, is cooled, has its pressure reduced, is liquefied, and is introduced into a second relatively colder stage of said second fractionation column.

The addition of this third step makes it possible to reduce the compressive power necessary for cooling fluids circulating in an installation according to the process.

The invention can also provide for the cooling and heating operations to be carried out in a number of heat exchangers, and for each of them to be supplied with one to three separate issuing fluids coming respectively from one to three separate cooling cycles.

According to a preferred embodiment of the invention, the cooling fluid(s) is(are) mixtures.

According to a preferred embodiment of the invention, a number of compressors are used for compressing the cooling fluid(s), and preferably, the compressors operate using electric motors.

The electricity can be produced by hydraulic, solar or nuclear power stations which do not produce any greenhouse gas.

According to a second of its aspects, the invention relates to a liquefied natural gas which is essentially free of nitrogen, and to nitrogen essentially free of hydrocarbons, obtained by a process according to the invention.

The (LNG) obtained by the process of the invention will usually and preferably contain less than 1 mol % of nitrogen, and the gaseous nitrogen obtained by the process of the invention will usually and preferably contain less that 1 mol % of hydrocarbons.

According to a third of its aspects, the invention relates to an installation for liquefaction of and extracting nitrogen from natural gas under pressure containing methane, $C_2$, and higher hydrocarbons and nitrogen, for obtaining, on the one hand, a liquefied natural gas essentially free of nitrogen, and on the other hand, gaseous nitrogen essentially free of hydrocarbons, which includes means for carrying out a first step (I) in which the natural gas is cooled, has its pressure reduced, and is liquefied in order to provide a flow of pressure-reduced liquefied natural gas, the pressure-reduced liquefied natural gas is separated, in a first fractionation column containing a number of stages, into a first top fraction that is relatively more volatile and that is nitrogen enriched, which is collected in the last stage of the first fractionation column, and a first bottom fraction that is relatively less volatile and that is nitrogen poor, including means for carrying out a second step (II) in which the first top fraction is cooled and liquefied in order to provide a first cooled and liquefied fraction, the first cooled and liquefied fraction is separated into a second top fraction that is relatively more volatile and very nitrogen enriched, and into a second bottom fraction that is relatively less volatile and relatively less nitrogen enriched, the second bottom fraction is introduced into the last stage of the first fractionation column, the second top fraction is heated in order to provide gaseous nitrogen, and the first bottom fraction is cooled in order to provide liquefied natural gas that is essentially free of nitrogen.

This installation has the advantage of using a limited number of elements for implementation of the process of the invention.

The installation of the invention can moreover include means for carrying out a third step (III) in which the first bottom fraction, before being cooled in order to obtain liquefied natural gas essentially free of nitrogen, is cooled, has its pressure reduced, and is introduced into a first relatively warmer stage of a second fractionation column, and the second top fraction, before being heated in order to provide gaseous nitrogen, is cooled, has its pressure reduced, is liquefied, and is introduced into a second relatively colder stage of said second fractionation column.

The installation of the invention can moreover provide for the cooling and heating operations to be carried out in heat exchangers, and for each of them to be supplied with one to three separate cooling fluids issuing respectively from one to three separate cooling cycles.

BRIEF DESCRIPTION OF THE DRAWINGS

The invention will be better understood and other characteristics, details and advantages of it will appear more clearly in the course of the following description, with reference to the appended diagrammatic drawings, given only as a non-limiting example, and in which.

A DETAILED DESCRIPTION

In these two figures, "FC" means "flow rate controller", "M" means "electric motor", "LC" means "liquid level controller", "PC" means "pressure controller", "G" means "electric generator", and "TC" means "temperature controller".

Figure 1:
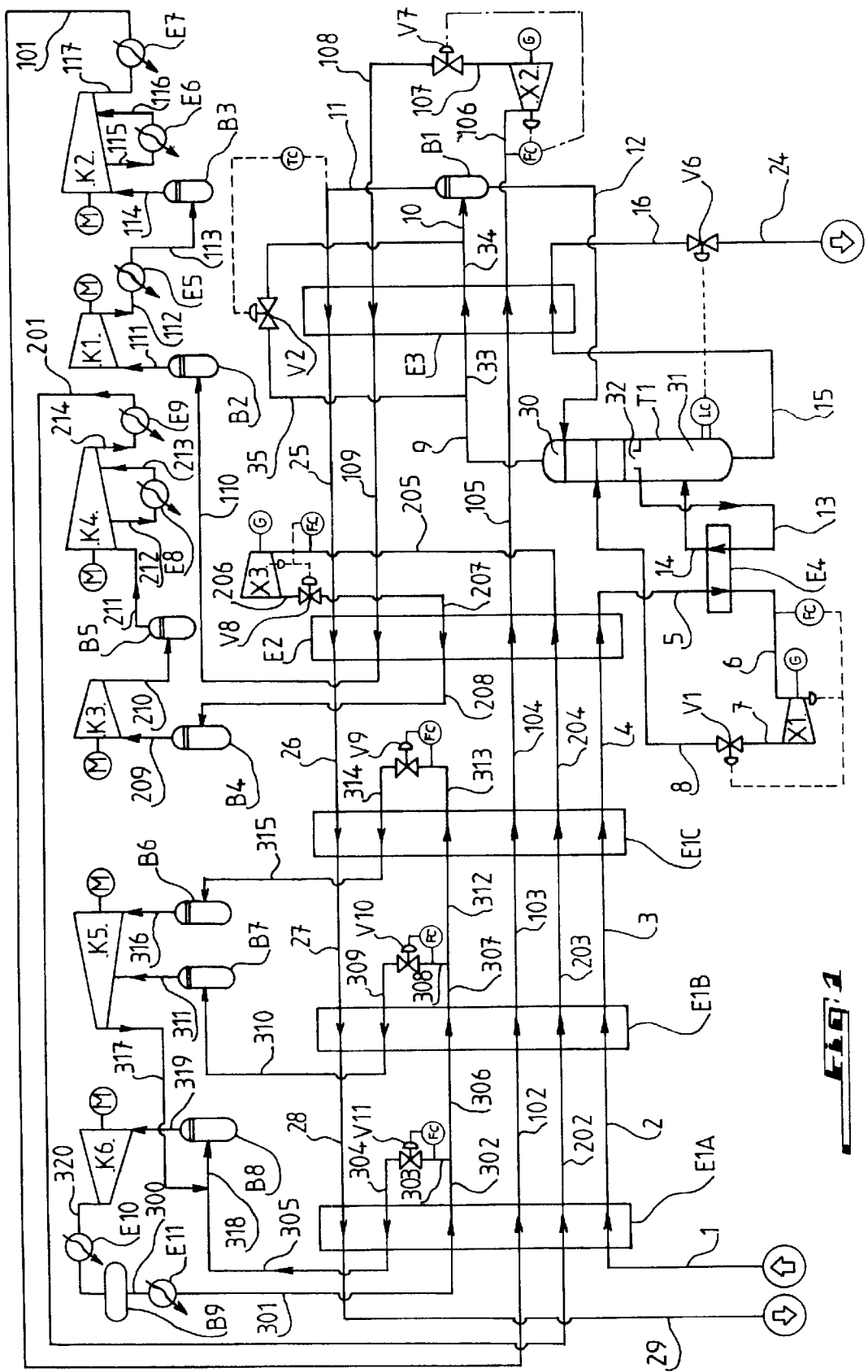
FIG. 1 represents a block diagram flow chart of an installation according to an embodiment of the invention.
Figure 2:
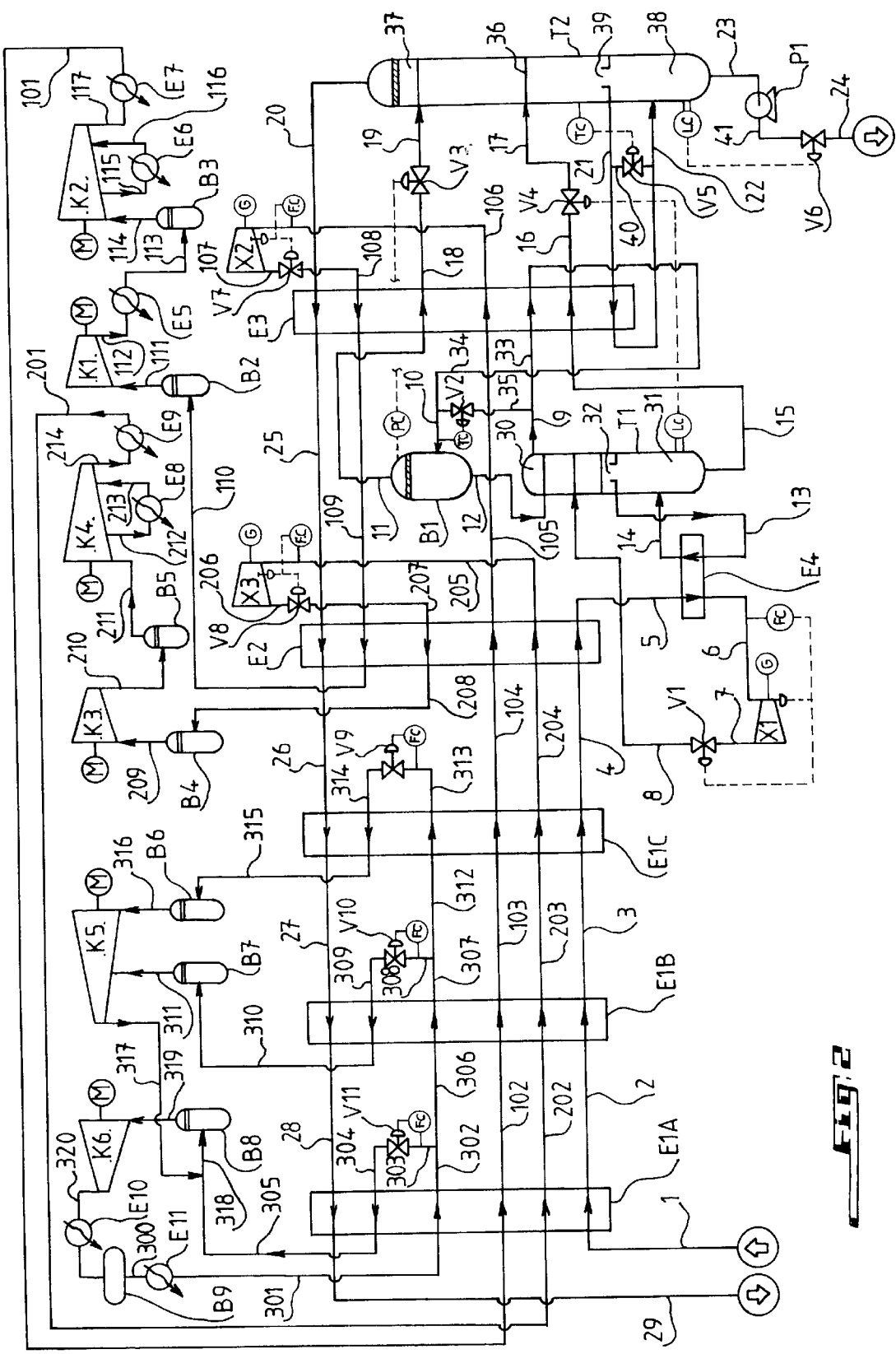
FIG. 2 represents a block diagram flow chart of an installation according to another preferred embodiment of the invention.

For the sake of clarity and conciseness, the pipes used in the installations of FIGS. 1 and 2 will have the same reference indications as the gaseous and liquid fractions circulating within them.

In reference to FIG. 1, the installation represented is intended for liquefying and extracting nitrogen from natural gas 1 under pressure, containing methane, $C_2$ and higher hydrocarbons and nitrogen, in order to obtain, on the one hand, liquefied natural gas (LNG) 24 essentially free of nitrogen, and on the other hand, gaseous nitrogen 29 essentially free of hydrocarbons.

The installation represented has four independent circuits.

A first circuit corresponds to the treatment of natural gas 1 for obtaining, on the one hand, liquefied natural gas 24, and on the other hand, gaseous nitrogen 29. The other three circuits correspond to cooling cycles using compressors K1–K6, which are necessary for the liquefaction of natural gas 1.

In the first circuit, natural gas 1 is cooled, has its pressure reduced, and is liquefied in order to provide a pressure-reduced LNG flow 8. Pressure-reduced LNG flow 8 is obtained by successive cooling in heat exchangers E1A, E1B, E1C, E2, and then E4. Liquefied natural gas 6 obtained coming out of exchanger E4 has its pressure reduced in turbine X1 coupled with an electric generator, in order to provide flow 7 which then has its pressure reduced in valve V1. The opening of valve VI is regulated by a flow rate controller on pipe 6. The introduction of flow 6 into turbine X1 is also regulated by this same flow rate controller.

Valve V1 produces, coming out of it, pressure-reduced LNG flow 8.

Pressure-reduced liquefied natural gas flow 8 is then separated into two fractions in first fractionation column T1, which contains a number of stages. This produces, in a last stage 30, first top fraction 9 that is relatively more volatile and is nitrogen enriched. It also produces first bottom fraction 15 that is relatively less volatile and is nitrogen-poor.

First fractionation column T1 contains column bottom reboiler 31 that includes plate 32. Flow 13 collected on plate 32 is heated in heat exchanger E4 in order to provide flow 14 which is reintroduced into first fractionation column T1 below plate 32.

First top fraction 9 is separated into first and second separation fractions 33 and 35. First separation fraction 33 is cooled and liquefied in exchanger E3 in order to provide first cooled separation fraction 34. Second separation fraction 35 circulates in pipe 35 containing valve V2; it is then mixed with first cooled separation fraction 34 in order to provide flow 10. The opening of valve V2 is controlled by a temperature controller positioned on pipe 10. Flow 10 is introduced into receiver B1 in order there to be separated into second top fraction 11 which is relatively more volatile and very nitrogen enriched, and second bottom fraction 12 which is relatively less volatile and relatively less nitrogen-rich.

Second bottom fraction 12 is introduced into last stage 30 of the first fractionation column T1.

Second top fraction 11 is heated successively in exchangers E3, E2, E1C, E1B and EIA in order to provide gaseous nitrogen 29.

First bottom fraction 15 is cooled in heat exchanger E3 in order to provide liquefied natural gas 24, essentially free of nitrogen. The reboiler of the bottom of first fractionation column T1 has a liquid level controller coupled with valve V6 mounted on the evacuation pipe for LNG 24 essentially free of nitrogen.

The installation represented in FIG. 1 has a second circuit which corresponds to a first cooling cycle. This first cooling cycle makes it possible to cool heat exchangers EIA, E1B and E1C, and has three vaporization pressure stages.

First cooling mixture 300 coming from storage receiver B9 is cooled by passage through cooler E11 in order to provide first cooled flow 301.

This first cooled flow 301 is cooled in heat exchanger E1A in order to provide second cooled flow 302. The latter is separated into:

third flow 303, which has its pressure reduced and is cooled in valve V11, the opening of which is controlled by a flow rate controller on pipe 303, in order to provide fourth cooled flow 304. Fourth cooled flow 304 is heated and vaporized in exchanger E1A in order to provide fifth flow 305, and into sixth flow 306, which is cooled in exchanger E1B in order to provide seventh flow 307.

Seventh flow 307 is separated into:

eighth flow 308, which has its pressure reduced and is cooled in valve V10, the opening of which is controlled by a flow rate controller on pipe 308, in order to provide ninth cooled flow 309. Ninth cooled flow 309 is heated and vaporized in exchanger E1B in order to provide tenth flow 310, and into twelfth flow 312 which is cooled in exchanger E1C in order to provide thirteenth flow 313.

Thirteenth flow 313 has its pressure reduced and is cooled in valve V9, the opening of which is controlled by a flow rate controller on pipe 313, in order to provide fourteenth cooled flow 314. Fourteenth cooled flow 314 is heated and vaporized in exchanger E1C in order to provide fifteenth flow 315.

Fifteenth flow 315 circulates in suction receiver B6 which produces sixteenth flow 316. The latter supplies compressor K5 at a low pressure stage.

Tenth flow 310 circulates in suction receiver B7 which produces an eleventh flow 311. The latter supplies compressor K5 at a medium pressure stage.

Compressor K5 is driven by a motor, preferably electric, and provides a compressed seventeenth flow 317.

Seventeenth flow 317 is mixed with fifth flow 305 in order to provide eighteenth flow 318. Eighteenth flow 318 circulates in suction receiver B8 which produces nineteenth flow 319. The latter supplies compressor K6 at a low pressure stage.

Compressor K6 is driven by a motor, preferably electric, and provides a compressed twentieth flow 320.

Twentieth flow 320 is cooled in cooler E10 and then stored in receiver B9.

The installation represented in FIG. 1 moreover has a third circuit which corresponds to a second cooling cycle. This second cooling cycle makes it possible to cool heat exchanger E2, and has a vaporization pressure stage.

Second cooling mixture 201 coming from cooler E9 is cooled and completely condensed by successive passage through heat exchangers E1A, E1B, E1C and E2 in order to provide first cooled and condensed flow 205.

This first cooled and condensed flow 205 has its pressure reduced in expansion turbine X3 coupled with an electric generator. The speed of rotation of expansion turbine X3 is regulated by a flow rate controller positioned on pipe 205. Expansion turbine X3 provides second pressure-reduced flow 206, which again has its pressure reduced by passage through valve V8 in order to provide third pressure-reduced and cooled flow 207.

The opening of valve V8 is also regulated by a flow rate controller positioned on pipe 205.

Third pressure-reduced and cooled flow 207 is heated and vaporized in exchanger E2 in order to provide fourth flow 208.

Fourth flow 208 circulates in suction receiver B4 which produces fifth flow 209. The latter supplies compressor K3 at a low pressure stage.

Compressor K3 is driven by a motor, preferably electric, and provides sixth compressed flow 210, which is collected by suction receiver B5. Suction receiver B5 produces seventh flow 211 which supplies compressor K4 at a low pressure stage. Compressor K4 provides eighth compressed flow 212 at a first medium pressure stage. Eighth flow 212 is cooled by passage through cooler E8 in order to provide ninth cooled flow 213, which is introduced at a second medium pressure stage of compressor K4.

Compressor K4 produces, at a high pressure stage, tenth compressed flow 214, which is cooled in cooler E9 in order to provide flow 201.

Moreover, the installation represented in FIG. 1 has a fourth circuit which corresponds to a third cooling cycle. This third cooling cycle makes it possible to cool heat exchanger E3, and has a vaporization pressure stage.

Third cooling mixture 101 coming from cooler E7 is cooled and completely condensed by successive passage through heat exchangers E1A, E1B, E1C, E2 and E3 in order to provide first cooled and condensed flow 106.

This first cooled and condensed flow 106 has its pressure reduced in expansion turbine X2 coupled with an electric generator. The speed of rotation of expansion turbine X3 [sic; X2] is regulated by a flow rate controller positioned on pipe 106. Expansion turbine X2 provides second pressure-reduced flow 107, which again has its pressure reduced by passage through valve V7 in order to provide third pressure-reduced and cooled flow 108.

The opening of valve V7 is also regulated by a flow rate controller positioned on pipe 106.

Third pressure-reduced and cooled flow 108 is heated and vaporized successively in exchangers E3 and E2 in order to provide fourth flow 110.

Fourth flow 110 circulates in suction receiver B2 which produces fifth flow 111. The latter supplies compressor K1 at a low pressure stage.

Compressor K1 is driven by a motor, preferably electric, and provides sixth compressed flow 112, which is cooled in cooler E5 in order to produce seventh flow 113. Seventh flow 113 is collected by suction receiver B3 which produces eighth flow 114 that supplies compressor K2 at a low pressure stage. Compressor K2 provides ninth compressed flow 115 at a first medium pressure stage. Ninth compressed flow 115 is cooled by passage through cooler E6 in order to provide tenth cooled flow 116, which is introduced at a second medium pressure stage of compressor K2.

Compressor K2 produces, at a high pressure stage, eleventh compressed flow 117, which is cooled in cooler E7 in order to provide flow 101.

In reference to FIG. 2, the installation represented is intended for liquefying and extracting nitrogen from natural gas 1 under pressure containing methane, $C_2$ and higher hydrocarbons and nitrogen, in order to obtain, on the one hand, liquefied natural gas (LNG) 24 essentially free of nitrogen, and on the other hand, gaseous nitrogen 29 essentially free of hydrocarbons.

The installation which is represented has four independent circuits and functions in a manner similar to the installation represented in FIG. 1, with the exception of the treatment for separation of nitrogen from the natural gas, which entails an additional distillation column.

Thus, as is the case in the installation represented in FIG. 1, a first circuit corresponds to the treatment of natural gas 1 for obtaining, on the one hand, liquefied natural gas 24, and on the other hand, gaseous nitrogen 29. The other three circuits correspond to cooling cycles using compressors K1–K6, which are necessary for the liquefaction of natural gas 1.

In the first circuit, natural gas 1 is cooled, has its pressure reduced, and is liquefied in order to provide a pressure-reduced LNG flow 8. Pressure-reduced LNG flow 8 is obtained by successive cooling in heat exchangers E1A, E1B, E1C, E2, and then E4. Liquefied natural gas 6 obtained coming out of exchanger E4 has its pressure reduced in turbine X1 coupled with an electric generator, in order to provide flow 7 which then has its pressure reduced in valve V1. The opening of valve V1 is regulated by a flow rate controller on pipe 6. The introduction of flow 6 into turbine X1 is also regulated by this same flow rate controller.

Valve V1 produces, coming out of it, pressure-reduced LNG flow 8.

Pressure-reduced liquefied natural gas flow 8 is then separated into two fractions in first fractionation column T1, which contains a number of stages. This produces, in last stage 30, first top fraction 9 which is relatively more volatile and is nitrogen enriched. It also produces first bottom fraction 15 which is relatively less volatile and is nitrogen poor.

First fractionation column T1 contains column bottom reboiler 31 which includes plate 32. Flow 13 collected on plate 32 is heated in heat exchanger E4 in order to provide flow 14 which is reintroduced into first fractionation column T1 below plate 32.

First top fraction 9 is separated into first and second separation fractions 33 and 35. First separation fraction 33 is cooled and liquefied in exchanger E3 in order to provide first cooled separation fraction 34. Second separation fraction 35 circulates in pipe 35 containing valve V2; it is then mixed with first cooled separation fraction 34 in order to provide flow 10. The opening of valve V2 is controlled by a temperature controller positioned on pipe 10. First cooled and liquefied fraction 10 is introduced into receiver B1 in order there to be separated into second top fraction 11 which is relatively more volatile and very nitrogen enriched, and second bottom fraction 12 which is relatively less volatile and relatively less nitrogen rich.

Second bottom fraction 12 is introduced into last stage 30 of said first fractionation column T1.

Second top fraction 11 is cooled in exchanger E3 in order to provide condensed fraction 18. Condensed fraction 18 flows through letdown valve V3, which produces pressure-reduced, partially vaporized, and cooled flow 19.

First bottom fraction 15 is cooled in heat exchanger E3 in order to provide cooled LNG flow 16. Flow 16 circulates through valve V4 which produces flow 17. Flow 17 is introduced into relatively warmer first stage 36 of second fractionation column T2.

Flow 19 is introduced into relatively colder second stage 37 of second fractionation column T2.

Second fractionation column T2 produces, at the bottom, liquefied natural gas 24 essentially free of nitrogen. Second fractionation column T2 has column bottom reboiler 38 which has plate 39. Flow 21 collected on plate 39 is heated in heat exchanger E3 in order to provide flow 22, which is reintroduced into second fractionation column T2 below plate 39. Before entering exchanger E3, the pipe which transports flow 21 has by-pass pipe 40 provided with valve V5. This by-pass pipe is connected to the pipe which transports flow 22. The opening of valve V5 is regulated by a temperature controller placed on second fractionation column T2, above plate 39.

First fractionation column T1 has a liquid level controller coupled with valve V4.

Second fractionation column T2 produces, at the bottom, LNG flow 23 which is pumped by pump P1 to evacuation pipe 41. Evacuation pipe 41 has draw-off valve V6, and produces LNG 24 essentially free of nitrogen.

The opening of draw-off valve V6 is regulated by a liquid level controller contained in the bottom of second fractionation column T2.

The installation represented in FIG. 2 has second, third and fourth circuits which are cooling circuits. In every point, these circuits correspond, respectively, to the second, third and fourth circuits in FIG. 1.

In order to allow a concrete assessment of the performance of an installation which functions according to the process of the invention, numerical examples are now presented for illustrative and non-limiting purposes. The pressures are given in bars and can be converted into hectoPascals (SI) by multiplication by 1000. When mixtures are present, the compositions of the flows of material circulating in the installation are given in mole % (mol %).

According to a model of the installation with the mode of operation of diagram 1, in the first circuit, dry natural gas 1, at 36.5° C. and 51.9 bar, is introduced into the installation with a flow rate of 36075 kmol/h. Dry natural gas 1 has the following composition: 0.0425% helium; 3.9061% nitrogen; 87.7956% methane; 5.3421% ethane; 1.9656% propane; 0.3485% isobutane; 0.5477% n-butane; 0.0368% isopentane; 0.0147% n-pentane; and 0.0004% n-hexane.

Dry natural gas 1 is cooled successively to 12.5°; minus 13° C.; minus 38° C; minus 105° C. and minus 120° C. in heat exchangers E1A, E1B, E1C, E2 and E4, in order to form flow 6. Flows 2, 3, 4 and 5 correspond respectively to each of the intermediate physical states of the dry natural gas after successive passage through each of heat exchangers E1A, E1B, E1C and E2.

Flow 6, which is liquid, has its pressure reduced from 49.5 bars to 18.5 bars in hydraulic turbine X1, whose power is 1042 kW, in order to give flow 7. This flow 7 has its pressure reduced from 18.5 to 16 bars in valve V1, and then is introduced into first fractionation column T1 that operates at a pressure of 10 bars and produces, at the top, first top fraction 9 with a temperature of minus 166.6° C., a pressure of 10.1 bars and a flow rate of 9668 kmol/h. First top fraction 9 contains 97.05% nitrogen and 2.77% methane.

First fractionation column T1 produces, at the bottom, first bottom fraction 15 with a temperature of minus 123.3° C., a pressure of 10.2 bars and a flow rate of 34903 kmol/h. First bottom fraction 15 contains 0.74% nitrogen and 90.72% methane.

First fractionation column T1 is equipped with reboiler or heat exchanger E4, whose thermal power is 9517 kW. Flow 13 is drawn off from plate 32 at minus 124.7° C. and 10.2 bars, with a flow rate of 39659 kmol/h, and is introduced into reboiler E4. The latter produces flow 14 at a temperature of minus 123.3° C., which is introduced below plate 32 of first fractionation column T1.

First bottom fraction 15 is cooled in heat exchanger E3 in order to produce flow 16 at minus 161.6° C. Flow 16, having its pressure reduced to 5 bars in valve V6, produces flow of LNG 24 essentially free of nitrogen, which is sent to storage.

Flow 24, produced at a rate of 34903 kmol/h, has the following composition: 0.0000% helium; 0.7408% nitrogen; 90.7263% methane; 5.5215% ethane; 2.0316% propane; 0.3602% isobutane; 0.5661% n-butane; 0.0380% isopentane; 0.0152% n-pentane; and 0.0004% n-hexane.

First top fraction 9 is cooled in heat exchanger E3 in order to provide cooled and liquefied fraction 10, at minus 169.2° C. The latter is separated in receiver B1 into second top fraction 11 which is relatively more volatile and very nitrogen enriched, and into second bottom fraction 12 which is relatively less volatile and relatively less nitrogen rich.

Second top fraction 11, produced with a flow rate of 1172 kmol/h at minus 169.3° C. and 10.0 bars, has the following composition: 1.3084% helium; 98.1921% nitrogen; 0.4995% methane; 0.0000% of other hydrocarbons.

Second bottom fraction 12, produced with a flow rate of 8496 kmol/h at minus 169.3° C. and 10.0 bars, has the following composition: 0.0131% helium; 96.8965% nitrogen; 3.0904% methane; 0.0000% of other hydrocarbons.

Second top fraction 11 is heated in heat exchangers E3, E2, E1C, E1B and E1A in order to produce gaseous nitrogen flow 29, at 7.0° C. and 9.8 bars. Flows 25, 26, 27 and 28 correspond respectively to each of the intermediate physical states of second top fraction 11 after successive passage through each of heat exchangers E3, E2, E1C and E1B.

Second bottom fraction 12 is introduced into last stage 30 of first fractionation column T1 in order to be treated there.

In the second circuit, which corresponds to the first cooling cycle, the cooling mixture contains 45% ethane and 55% propane. Flow 300 coming from receiver B9 at 41.5° C. and 30.15 bars, is cooled in exchanger E11 to 36.5° C. and 29.65 bars in order to form flow 301, whose flow rate is 64000 kmol/h.

First flow 301 is cooled in heat exchanger E1A to 12.5° C. and 29.35 bars in order to form second flow 302. Second flow 302 is divided into third flow 303, whose flow rate is 21000 kmol/h, and into sixth flow 306, whose flow rate is 43000 kmol/h.

Third flow 303 has its pressure reduced to 15.85 bars in valve V11 in order to form fourth flow 304. The latter is vaporized and heated to 31.1° C. in exchanger E1A in order to produce fifth flow 305 at 15.65 bars.

Sixth flow 306 is cooled in heat exchanger E1B to minus 13.0° C. and 29.35 bars in order to form seventh flow 307. Seventh flow 307 is divided into eighth flow 308, whose flow rate is 25800 kmol/h, and into twelfth flow 312, whose flow rate is 17200 kmol/h.

Eighth flow 308 has its pressure reduced to 7.81 bars in valve V10 in order to form ninth flow 309. The latter is vaporized and heated to 7.39° C. in exchanger E1B in order to produce tenth flow 310 at 7.61 bars.

Twelfth flow 312 is cooled in heat exchanger E1C to minus 38.0° C. and 28.55 bars in order to form thirteenth flow 313. Thirteenth flow 313 has its pressure reduced to 3.83 bars in valve V9 in order to form fourteenth flow 314. The latter is vaporized and heated to minus 19.0° C. in exchanger E1C in order to produce fifteenth flow 315 at 3.63 bars.

Fifteenth flow 315 passes through suction receiver B6, which produces sixteenth flow 316 that enters the low pressure intake of compressor K5 at minus 19.20° C. and 3.53 bars.

Tenth flow 310 passes through suction receiver B7, which produces eleventh flow 311 that enters the medium pressure intake of compressor K5 at 7.20° C. and 7.51 bars.

Compressor K5 produces 43000 kmol/h of seventeenth flow 317 at 49.5° C. and 15.65 bars.

Seventeenth flow 317 is mixed with fifth flow 305 in order to produce 64000 kmol/h of eighteenth flow 318. The latter passes through suction receiver B8, which produces nineteenth flow 319 that enters the low pressure intake of compressor K6 at 43.25° C. and 15.55 bars.

Compressor K6 produces twentieth flow 320 at 82.62° C. and 30.66 bars. Twentieth flow 320 is cooled in exchanger E10 before being stored in receiver B1 at 41.5° C. and 30.16 bars.

In the third circuit, which corresponds to the second cooling cycle, second cooling mixture contains 26% methane, 69% ethane and 5% propane. Second cooling mixture 201, coming from cooler E9 at 36.5° and 31.36 bars with a flow rate of 34700 kmol/h, is cooled successively in exchangers E1A, E1B, E1C and E2 to, respectively, 12.5° C.; minus 13° C.; minus 38° C.; and minus 105° C. in order to form first flow 205. Flows 202, 203 and 204 correspond respectively to each of the intermediate physical states of the second cooling mixture after successive passage through each of heat exchangers E1A, E1B and E1C.

First cooled and condensed flow 205 has its pressure reduced in expansion turbine X3. Expansion turbine X3 provides second pressure-reduced flow 206 at a pressure of 9.00 bars and a temperature of minus 105.3° C. Second flow 206 again has its pressure reduced by passage through valve V8 in order to provide third flow 207, which has its pressure reduced to 3.00 bars and is cooled to minus 115.6° C.

Third pressure-reduced and cooled flow 207 is heated and vaporized in exchanger E2 in order to provide 34700 kmol/h of fourth flow 208 at minus 40.1° C. and 2.7 bars.

Fourth flow 208 circulates in suction receiver B4, which produces fifth flow 209. The latter supplies compressor K3 at 2.60 bars and minus 40.3° C.

Compressor K3 provides sixth flow 210 at a temperature of 38.1° C. and a pressure of 10.58 bars, which is collected by suction receiver B5. The latter produces seventh flow 211 which supplies compressor K4 at 10.48 bars. Compressor K4 provides eighth compressed flow 212 at 74.0° C. and 18.05 bars. Seventh flow 212 is cooled by passage through cooler E8 in order to provide ninth cooled flow 213 at 36.5° C. and 17.75 bars. This is introduced at the second medium pressure stage of compressor K4.

Compressor K4, at the high pressure stage, provides tenth compressed flow 214 at 31.66 bars and 75.86° C., which is cooled to 36.5° C. in cooler E9 in order to provide the aforementioned flow 201.

In the fourth circuit, which corresponds to the third cooling cycle, third cooling mixture 101 contains 35% nitrogen, 54% methane, and 11% ethane. Third cooling mixture 101, coming from cooler E7 at 36.5° C. and 47.00 bars with a flow rate of 22500 kmol/h, is cooled successively in exchangers E1A, E1B, E1C, E2 and E3 to, respectively, 12.5° C.; minus 13° C.; minus 38° C.; minus 105° C. and minus 170.0° C. in order to form first flow 106. Flows 102, 103, 104 and 105 correspond respectively to each of the intermediate physical states of the third cooling mixture after successive passage through each of heat exchangers E1A, E1B, E1C and E2.

First cooled and condensed flow 106 has its pressure reduced in expansion turbine X2. Expansion turbine X2 provides second pressure-reduced flow 107 at a pressure of 5.00 bars and a temperature of minus 170.7° C. Second flow 107 again has its pressure reduced by passage through valve V7 in order to provide third flow 108, which has its pressure reduced to 2.50 bars and is cooled to minus 179.2° C.

Third pressure-reduced and cooled flow 108 is heated and vaporized in exchanger E3 in order to provide 22500 kmol/h of fourth flow 109 at minus 107.4° C. and 2.30 bars.

Fourth flow 109 is heated in exchanger E2 to minus 41.0° C. and then circulates in suction receiver B2, which produces fifth flow 111. The latter supplies compressor K1 at 2.00 bars and minus 41.1° C.

Compressor K1 provides sixth flow 112 at a temperature of 104.0° C. and a pressure of 10.95 bars, which is cooled to 36.5° C. by cooler E5 in order to provide seventh flow 113. This is collected by suction receiver B3. The latter produces eighth flow 114, which supplies compressor K2 at 10.5 bars. Compressor K2 provides ninth compressed flow 115 at 104.0° C. and 21.74 bars. Ninth flow 115 is cooled by passage through cooler E6 in order to provide tenth cooled flow 116 at 36.5° C. and 21.44 bars. This is introduced at the second medium pressure stage of compressor K2.

Compressor K2, at its high pressure stage, provides eleventh compressed flow 117 at 47.30 bars and 47.3° C., which cooled to 36.5° C. in cooler E7 in order to provide the aforementioned flow 101.

According to a model of the installation with the mode of operation of diagram 2, in the first circuit, dry natural gas 1, at 36.5° C. and 51.9 bar, is introduced into the installation with a flow rate of 36075 kmol/h. Dry natural gas 1 has the same composition as in the model of the installation with the mode of operation of diagram 1.

Dry natural gas 1 is cooled successively to 12.5°; minus 13° C.; minus 38° C.; minus 98° C. and minus 114° C. in heat exchangers E1A, E1B, E1C, E2 and E4 in order to form flow 6. Flows 2, 3, 4 and 5 correspond respectively to each of the intermediate physical states of the dry natural gas after successive passage through each of heat exchangers E1A, E1B, E1C and E2.

Flow 6, which is liquid, has its pressure reduced from 49.5 bars to 18.5 bars in hydraulic turbine X1, whose power is 1072 kW, in order to give flow 7. This flow 7 has its pressure reduced from 18.5 to 16 bars in valve V1, and is then introduced into first fractionation column T1 that operates at a pressure of 15 bars and produces, at the top, first top fraction 9 with a temperature of minus 142.7° C., a pressure of 15.1 bars and a flow rate of 7454 kmol/h. First top fraction 9 contains 74.65% nitrogen and 25.13% methane.

First fractionation column T1 produces, at the bottom, first bottom fraction 15 with a temperature of minus 114.3° C., a pressure of 15.2 bars and a flow rate of 34993 kmol/h. First bottom fraction 15 contains 1.16% nitrogen and 90.32% methane.

First fractionation column T1 is equipped with reboiler or heat exchanger E4, whose thermal power is 10472 kW. Flow 13 is drawn off from plate 32 at minus 115.9° C. and 15.2 bars, with a flow rate of 34993 kmol/h, and is introduced into reboiler E4. The latter produces flow 14 at a temperature of minus 114.3° C., which is introduced below plate 32 of first fractionation column T1.

First bottom fraction 15 is cooled in heat exchanger E3 in order to produce flow 16 at minus 166.0° C. Flow 16, after being relieved of pressure to 1.4 bar in valve V4, produces flow 17, which is sent to relatively warmer first stage 36 of second fractionation column T2.

In second fractionation column T2, reboiler or heat exchanger E4 contains plate 32 from which flow 21 is drawn off at minus 161.0° C. and 1.2 bar, with a flow rate of 36683 kmol/h. Flow 21 circulates in heat exchanger E3 in order to produce flow 22, at a temperature of minus 159.4° C., which is introduced below plate 32 of first fractionation column T1. The thermal power exchanged between flows 21 and 22 is 5153 kW.

Second fractionation column T2 produces, at the bottom, flow 23 at minus 159.4° C. and 1.2 bar. Flow 23 is pumped by pump P1, which produces flow 41. Flow 41 is drawn off via valve V6 in order to produce flow of LNG 24 essentially free of nitrogen, at 4.2 bars and minus 159.3° C.

Flow 24, produced at a rate of 34763 kmol/h, has the following composition: 0.0000% helium; 0.3427% nitrogen; 91.0899% methane; 5.5437% ethane; 2.0398% propane; 0.3617% isobutane; 0.5684% n-butane; 0.0382% isopentane; 0.0153% n-pentane; and 0.0004% n-hexane.

First top fraction 9 is cooled in heat exchanger E3 in order to provide first cooled and liquefied fraction 10 at minus 157.7° C. The latter is separated in receiver B1 into second top fraction 11 which is relatively more volatile and very nitrogen enriched, and into second bottom fraction 12 which is relatively less volatile and relatively less nitrogen rich.

Second top fraction 11, produced with a flow rate of 1082 kmol/h at minus 157.7° C. and 15.0 bars, has the following composition: 1.4172% helium; 92.5819% nitrogen; 6.0009% methane; 0.0000% of other hydrocarbons.

Second bottom fraction 12, produced with a flow rate of 6372 kmol/h, goes back to first fractionation column T1 at last stage 30 in order to be re-treated there.

Second top fraction 11 is cooled in exchanger E3, and provides fraction 18 at minus 178° C. and 14.5 bars. The latter has its pressure reduced in valve V3 in order to produce flow 19 at 1.3 bar and minus 193.7° C. Flow 19 is introduced into relatively colder second stage 37 of second fractionation column T2.

Second fractionation column T2 produces, at the top, flow 20 at minus 193.4° C. and 1.2 bar, with a flow rate of 1312 kmol/h.

Flow 20 is heated in heat exchangers E3, E2, E1C, E1B and E1A in order to produce gaseous nitrogen flow 29 at 30.0° C. and 1.04 bar. Flows 25, 26, 27 and 28 correspond respectively to each of the intermediate physical states of flow 20 after successive passage through each of heat exchangers E3, E2, E1C, and E1B.

Gaseous nitrogen flow 29 contains 1.1687% helium, 98.3313% nitrogen, 0.5% methane and 0.0000% other hydrocarbons.

In the second circuit, which corresponds to the first cooling cycle, the cooling mixture contains 45% ethane and 55% propane. Flow 300, coming from receiver B9 at 41.5° C. and 30.15 bars, is cooled in exchanger E11 to 36.5° C. and 29.65 bars in order to form flow 301, whose flow rate is 64000 kmol/h.

First flow 301 is cooled in heat exchanger E1A to 12.5° C. and 29.35 bars in order to form second flow 302. Second flow 302 is divided into third flow 303, whose flow rate is 21000 kmol/h, and into sixth flow 306, whose flow rate is 43000 kmol/h.

Third flow 303 has its pressure reduced to 15.85 bars in valve V11 in order to form fourth flow 304. The latter is vaporized and heated to 29.5° C. in exchanger E1A in order to produce fifth flow 305 at 15.65 bars.

Sixth flow 306 is cooled in heat exchanger E1B to minus 13.0° C. and 29.35 bars in order to form seventh flow 307. Seventh flow 307 is divided into eighth flow 308, whose flow rate is 25800 kmol/h, and into twelfth flow 312, whose flow rate is 17200 kmol/h.

Eighth flow 308 has its pressure reduced to 7.81 bars in valve V10 in order to form ninth flow 309. The latter is vaporized and heated to 5.58° C. in exchanger E1B in order to produce tenth flow 310 at 7.61 bars.

Twelfth flow 312 is cooled in heat exchanger E1C to minus 38.0° C. and 28.55 bars in order to form thirteenth flow 313. Thirteenth flow 313 has its pressure reduced to 3.83 bars in valve V9 in order to form fourteenth flow 314 at minus 40.8° C. and 3.83 bars. The latter is vaporized and heated to minus 20.7° C. in exchanger E1C in order to produce fifteenth flow 315 at 3.63 bars.

Fifteenth flow 315 passes through suction receiver B6, which produces sixteenth flow 316 that enters the low pressure intake of compressor K5 at minus 20.94° C. and 3.53 bars.

Tenth flow 310 passes through suction receiver B7, which produces eleventh flow 311 that enters the medium pressure intake of compressor K5 at 5.39° C. and 7.51 bars.

Compressor K5 produces 43000 kmol/h of seventeenth flow 317 at 47.7° C. and 15.65 bars.

Seventeenth flow 317 is mixed with fifth flow 305 in order to produce 64000 kmol/h of eighteenth flow 318. The latter passes through suction receiver B8, which produces nineteenth flow 319 that enters the low pressure intake of compressor K6 at 41.50° C. and 15.55 bars.

Compressor K6 produces twentieth flow 320 at 80.95° C. and 30.66 bars. Twentieth flow 320 is cooled in exchanger E10 before being stored in receiver B13 at 41.5° C. and 30.16 bars.

In the third circuit, which corresponds to the second cooling cycle, second cooling mixture 201 contains 25% methane, 70% ethane and 5% propane. Second cooling mixture 201, coming from cooler E9 at 36.5° and 30.48 bars with a flow rate of 34200 kmol/h, is cooled successively in exchangers E1A, E1B, E1C and E2 to, respectively, 12.5° C.; minus 13° C.; minus 38° C.; and minus 98.0° C. in order to form first flow 205. Flows 202, 203 and 204 correspond respectively to each of the intermediate physical states of the second cooling mixture after successive passage through each of heat exchangers E1A, E1B and E1C.

First cooled and condensed flow 205 has its pressure reduced in expansion turbine X3. Expansion turbine X3 provides second pressure-reduced flow 206 at a pressure of 9.00 bars and a temperature of minus 98.3° C. Second flow 206 again has its pressure reduced by passage through valve V8 in order to provide third flow 207, which has its pressure reduced to 3.00 bars and is cooled to minus 111.1° C.

Third pressure-reduced and cooled flow 207 is heated and vaporized in exchanger E2 in order to provide 34200 kmol/h of fourth flow 208 at minus 40.5° C. and 2.7 bars.

Fourth flow 208 circulates in suction receiver B4, which produces fifth flow 209. The latter supplies compressor K3 at 2.60 bars and minus 40.7° C.

Compressor K3 provides sixth flow 210 at a temperature of 36.5° C. and a pressure of 10.41 bars, which is collected by suction receiver B5. The latter produces seventh flow 211 which supplies compressor K4 at 10.31 bars. Compressor K4 provides eighth compressed flow 212 at 74.0° C. and 18.25 bars. Eighth flow 212 is cooled by passage through cooler E8 in order to provide ninth cooled flow 213 at 36.5° C. and 17.95 bars. This is introduced at the second medium pressure stage of compressor K4.

Compressor K4, at the high pressure stage, provides tenth compressed flow 214 at 30.78 bars and 73.01° C., which is cooled to 36.5° C. in cooler E9 in order to provide the aforementioned flow 201.

In the fourth circuit, which corresponds to the third cooling cycle, third cooling mixture 101 contains 15% nitrogen, 77% methane, and 8% ethane. Third cooling mixture 101, coming from cooler E7 at 36.5° and 43.55 bars with a flow rate of 20200 kmol/h, is cooled successively in exchangers E1A, E1B, E1C, E2 and E3 to, respectively, 12.5° C.; minus 13° C.; minus 38° C.; minus 98° C. and minus 166.0° C. in order to form first flow 106. Flows 102, 103, 104 and 105 correspond respectively to each of the intermediate physical states of the third cooling mixture after successive passage through each of heat exchangers E1A, E1B, E1C and E2.

First cooled and condensed flow 106 has its pressure reduced in expansion turbine X2. Expansion turbine X2 provides second pressure-reduced flow 107 at a pressure of 4.00 bars and a temperature of minus 166.4° C. Second flow 107 again has its pressure reduced by passage through valve V7 in order to provide third flow 108, which has its pressure reduced to 2.60 bars and is cooled to minus 169.3° C.

Third pressure-reduced and cooled flow 108 is heated and vaporized in exchanger E3 in order to provide 20200 kmol/h of fourth flow 109 at minus 100.6° C. and 2.40 bars.

Fourth flow 109 is heated in exchanger E2 to minus 41.0° C. and then constitutes flow 110. Flow 110 next circulates in suction receiver B2, which produces fifth flow 111. The latter supplies compressor K1 at 2.10 bars and minus 41.1° C.

Compressor K1 provides sixth flow 112 at a temperature of 100.0° C. and a pressure of 11.51 bars, which is cooled to 36.5° C. by cooler E5 in order to provide seventh flow 113. This is collected by suction receiver B3. The latter produces eighth flow 114, which supplies compressor K2 at 11.21 bars. Compressor K2 provides ninth compressed flow 115 at 100.0° C. and 22.41 bars. Ninth flow 115 is cooled by passage through cooler E6 in order to provide tenth cooled flow 116 at 36.5° C. and 22.11 bars. This is introduced at the second medium pressure stage of compressor K2. Compressor K2, at its high pressure stage, provides eleventh compressed flow 117 at 43.85 bars and 99.8° C., which cooled to 36.5° C. in cooler E7 in order to provide the aforementioned flow 101.

The use of a process according to the invention using an installation according to the schematic representation given in FIG. 2, that is to say using a second fractionation column, makes possible an energy savings of 12270 kW based on all the energy expenditures, or 6.28%.

The powers of the different compressors are the following (expressed in kW):

| Compressor | Scheme 1 | Scheme 2 |
| --- | --- | --- |
| K1 | 32070 | 28600 |
| K2 | 32310 | 26100 |
| K3 | 33100 | 32100 |
| K4 | 33080 | 32140 |
| K5 | 32310 | 32010 |
| K6 | 32530 | 32180 |
| Total | 195400 | 183130 |

The powers of the motors are balanced, and are less than 35000 kW.

The invention therefore offers an advantage with regard to limiting energy expenditures during production of purified gases. This aim is attained while allowing great selectivity in separation of the methane and other constituents of the natural gas during implementation of the process.

According to scheme 2, the energy consumption is 183130 kW in order to produce 620710 kg/h of denitrified LNG. The specific consumption is 0.295 kWh/kg of denitrified LNG, which is comparable to that of conventional installations which produce fuel gas with a high nitrogen content.

Thus, the results obtained by the invention provide great advantages consisting of substantial simplification and savings in the execution and technology of the equipment and methods used as well as in the quality of the products obtained by these methods.

What claimed is:

1. A process for liquefaction of and nitrogen extraction from natural gas under pressure containing methane, $C_2$, and higher hydrocarbons and nitrogen in order to obtain liquefied natural gas essentially free of nitrogen, and gaseous nitrogen essentially free of hydrocarbons, the process including a first step in which natural gas is cooled, has its pressure reduced, and is liquefied in order to provide pressure-reduced liquefied natural gas flow and the pressure-reduced liquefied natural gas is separated, in a first fractionation column containing a number of stages, into a first top fraction that is more volatile and that is nitrogen enriched, relative to a bottom fraction, and collected in a last stage of the first fractionation column; and a second step in which the first top fraction is cooled and liquefied in order to provide a first cooled and liquefied fraction, that is separated into a second top fraction that is more volatile and nitrogen enriched relative to a second bottom fraction, the second bottom fraction is introduced into a last stage of the first fractionation column, the second top fraction is heated in order to produce gaseous nitrogen, and, the first bottom fraction is cooled in order to produce liquefied natural gas essentially free of nitrogen.

2. The process according to claim 1, including a third step in which the first bottom fraction, before being cooled in order to produce liquefied natural gas essentially free of nitrogen, is cooled, has its pressure reduced, and is introduced into a first relatively warmer stage of the second fractionation column, and the second top fraction, before being heated in order to produce gaseous nitrogen, is cooled, liquefied, has its pressure reduced, and is introduced into a second relatively colder stage of the second fractionation column.

3. The process according to claim 1, wherein the cooling and heating operations are carried out in a plurality of heat exchangers, and each of the heat exchangers is supplied with up to three separate cooling fluids coming respectively from up to three separate cooling cycles.

4. The process according to claim 3, wherein the cooling fluids are mixtures.

5. The process according to claim 3, wherein a plurality of compressors are used for compressing the cooling fluids.

6. The process according to claim 5, wherein the compressors are driven by electric motors.

7. Liquefied natural gas essentially free of nitrogen produced by the process according to claim 1.

8. Gaseous nitrogen essentially free of hydrocarbons produced by the process according to claim 1.

9. An apparatus for liquefaction of and nitrogen extraction from natural gas under pressure containing methane, $C_2$, and higher hydrocarbons and nitrogen, for obtaining liquefied natural gas essentially free of nitrogen, and gaseous nitrogen essentially free of hydrocarbons, the apparatus including means for carrying out a first step in which natural gas is cooled, has its pressure reduced, and is liquefied in order to provide pressure-reduced liquefied natural gas flow, a first fractionation column containing a number of stages and in which the pressure-reduced liquefied natural gas is separated into a first top fraction that is more volatile and that is nitrogen enriched, relative to a first bottom fraction, and is collected in a last stage of the first fractionation column, means for carrying out a second step in which the first top fraction is cooled and liquefied in order to provide a first cooled and liquefied fraction, the first cooled and liquefied fraction is separated into a second top fraction that is more volatile and very nitrogen enriched relative to a second bottom fraction, the second bottom fraction is introduced into a last stage of the first fractionation column, the second top fraction is heated in order to produce gaseous nitrogen, and the first bottom fraction is cooled in order to produce liquefied natural gas essentially free of nitrogen.

10. The apparatus for liquefaction and nitrogen extraction according to claim 9, including means for, before cooling the first bottom fraction in order to produce liquefied natural gas essentially free of nitrogen, reducing pressure of the first bottom fraction, and, a second fractionation column having a relatively warmer stage into which the first bottom fraction is introduced, and, before heating the second top fraction in order to produce gaseous nitrogen, cooling, reducing pressure, liquefying, and introducing the second top fraction into a second relatively colder stage of said second fractionation column.

11. The apparatus for liquefaction and nitrogen extraction according to claim 9, including heat exchangers for cooling and heating operations, each of the heat exchangers being supplied with up to three separate cooling fluids coming respectively from up to three separate cooling cycles.

* * * * *